UNITED STATES PATENT OFFICE.

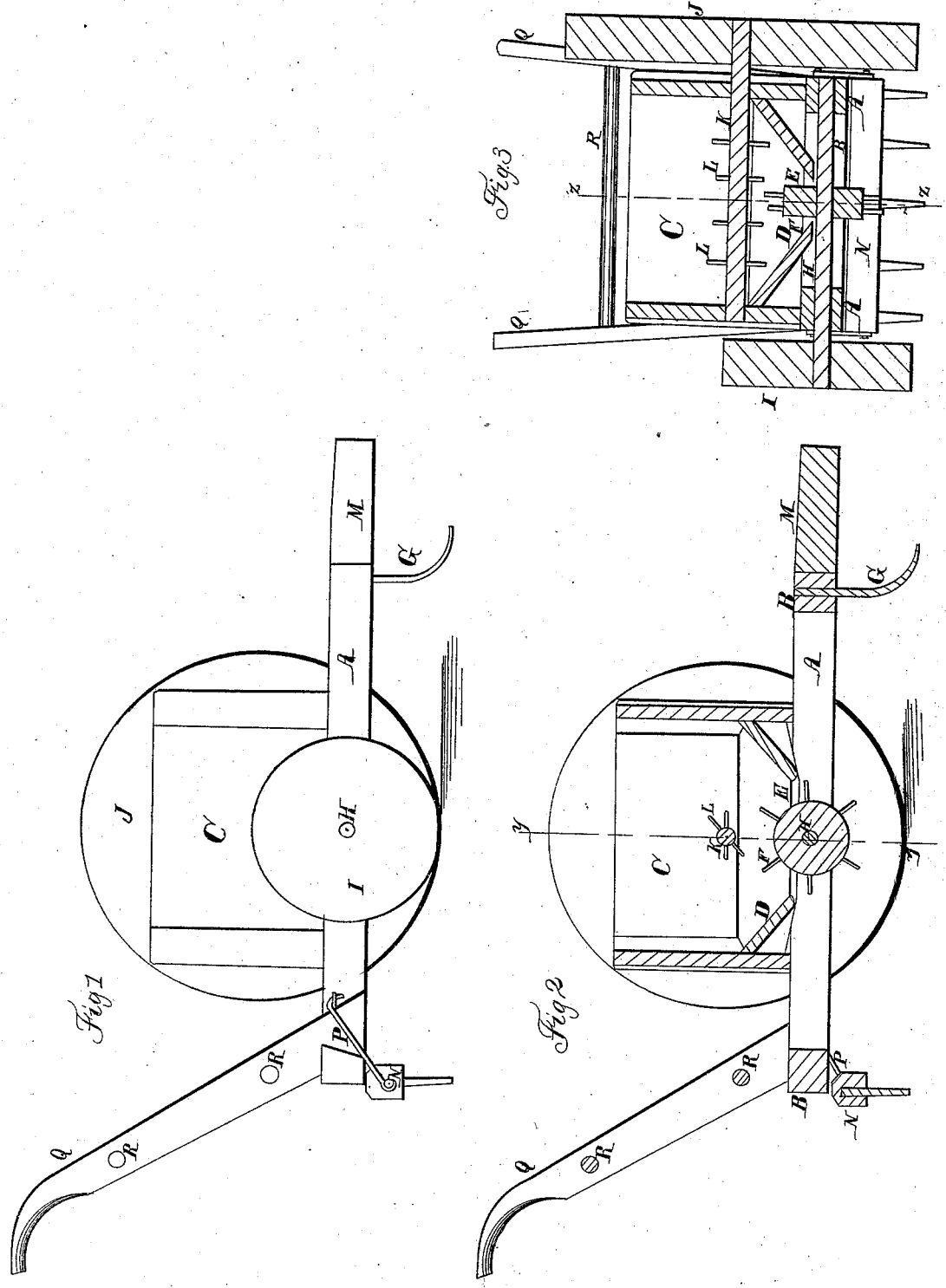

J. T. WAIT AND L. J. WAIT, OF WATERLOO, SOUTH CAROLINA.

IMPROVEMENT IN SEED-PLANTERS.

Specification forming part of Letters Patent No. 11,537, dated August 15, 1854.

*To all whom it may concern:*

Be it known that we, J. TRAVIS WAIT and L. JASPER WAIT, of Waterloo, in the county of Lawrence and State of South Carolina, have invented a new and useful Machine for Planting Cotton and other Seeds; and we do hereby declare that the same is described and represented in the following specification and drawings.

To enable others skilled in the art to make and use our invention, we will proceed to describe its construction and operation, referring to the drawings, in which the same letters indicate like parts in each of the figures.

Figure 1 is an elevation of the machine. Fig. 2 is a sectional elevation through the line $z\,z$ of Fig. 3. Fig. 3 is a section through the line $y\,y$ of Fig. 2.

The nature of our invention consists in making one of the wheels upon which the machine travels larger than the other and putting them upon separate axles, so as to operate the burr or apparatus which stirs the seed slower than the burr or apparatus which delivers the seed.

In the above-mentioned drawings, A A are the side rails, and B B the cross-bars of the frame of the machine, upon which frame the seed-box C is fastened, as represented. The bottom D of this seed-box descends from each side toward the center, as represented in the sections, and is provided with an opening, E, in the center, in which the burr F turns and carries the seed in the box out through the opening E, so as to let it fall into the furrow formed by the cultivator-tooth G, fastened in the fore end of the frame, as represented. The burr F may be made in the form represented or in such other form as may be desirable, and fastened to the shaft H, which turns in holes fitted for it in the side rails, B B. This shaft H has the smaller driving-wheel, I, fastened to it for the machine to travel on, in conjunction with the larger wheel, J, fastened to the shaft K, which shaft turns in holes fitted for it in the sides of the seed-box C, as represented. The shaft K is provided with a series of pins, L L, to stir the seed, so as to insure the burr F to deliver it constantly and uniformly as the machine is drawn forward upon the ground. The cultivator-tooth G should be so constructed as to form a furrow for the seed, as the machine is drawn forward, by some convenient fixture fastened to the tongue M, which tongue is fastened to the center of the forward cross-bar B. The bar N is provided with a series of harrow-teeth, (or scrapers may be used,) to harrow the ground after the seed is deposited, so as to cover it or mix the earth with the seed and finish the operation of planting. This bar N is fastened to the frame of the machine by the hooks P P, as represented, which hooks permit the bar to vibrate, so as to draw the harrow-teeth in the ground when the rear end of the frame is raised or lowered. The handles Q Q are fastened to the rear end of the frame, and are connected together by the rounds R R, which handles enable the planter to guide the machine in the operation of planting.

The machine having been constructed and completed as above described, the box C is filled with cotton-seed, and an animal is hitched to the tongue, and the planter seizes the handle and guides the machine, and as it is drawn forward the smaller wheel, I, turns and carries the burr F, which delivers and distributes the seed, and at the same time the larger wheel turns the shaft K, so that the pins L L stir the seed, which has so much of the fibrous matter adhering to it that if it were not stirred it would not fall down or come within the influence of the burr F, so that as soon as the burr F had forced out what seed lay against it it would cease planting; but by stirring the seed constantly, as it is done by means of the pins L L, kept in motion by the wheel J, the burr F is constantly and uniformly supplied with seed.

Numerous machines have been made for planting cotton-seed, most of which are either so complicated that the slaves cannot manage them to advantage, or do not distribute the seed uniformly or with sufficient certainty to warrant their use, as the seed of most varieties of cotton are covered with wool that makes the seed more difficult to plant, perhaps, than any other seed known to the agriculturist. Hence we were induced to make a series of experiments, which resulted in the production of the above-described machine, so constructed without gearing, pulleys, or bands (consequently there are none to get out of order or to be repaired) that it may be used to great advantage by persons with comparatively little knowledge or skill in the science of mechanics.

Our machine is so simple in its construction and composed of so few parts that it may be made cheaper than any other; besides, it is far better than any heretofore made.

We contemplate that our machine may be made wide enough to plant two or more rows at once, as two or more delivering-burrs may be fastened to the same shaft; also, that it may be used to plant other kinds of seed besides cotton-seed.

We are aware that two shafts have been used before, one or both of which have been operated by gears or some equivalent device. Therefore we do not claim the agitating and delivering shafts independent of the means we use to operate them; but

What we claim as our invention, and desire to secure by Letters Patent, is—

Making one wheel larger than the other and putting them on separate axles, so as to make one operate the burr or apparatus which stirs the seed and the other the burr or apparatus which delivers the seed, substantially as described, without the aid of gearing or other equivalent devices.

In testimony whereof we have hereunto signed our names before two witnesses.

J. T. WAIT.
L. J. WAIT.

Witnesses:
WM. B. ANDERSON,
JOSEPH F. GRAVES.